United States Patent
Huang

(10) Patent No.: US 9,848,156 B2
(45) Date of Patent: Dec. 19, 2017

(54) TELEVISION SYSTEM AND MULTIMEDIA PLAYING METHOD

(71) Applicant: MStar Semiconductor, Inc., Hsinchu Hsien (TW)

(72) Inventor: Hung-Chi Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/227,173

(22) Filed: Aug. 3, 2016

(65) Prior Publication Data

US 2017/0208286 A1    Jul. 20, 2017

(30) Foreign Application Priority Data

Jan. 15, 2016  (TW) .............................. 105101190 A

(51) Int. Cl.
*H04N 5/44*    (2011.01)
*H04N 5/50*    (2006.01)

(52) U.S. Cl.
CPC ............. *H04N 5/4403* (2013.01); *H04N 5/50* (2013.01)

(58) Field of Classification Search
CPC ...... H04N 5/44; H04N 5/4401; H04N 5/4403; H04N 5/50; H04N 5/44543; H04N 5/775; H04N 5/44513; H04N 9/64; H04N 9/646

USPC ....... 348/552, 708, 571, 553, 563, 720, 721, 348/725; 725/37, 135, 139, 143, 151
See application file for complete search history.

(56) References Cited

U.S. PATENT DOCUMENTS

2013/0342762 A1* 12/2013 Wang .................... H04N 19/70
348/583

FOREIGN PATENT DOCUMENTS

TW        201023646 A    6/2010

* cited by examiner

*Primary Examiner* — Sherrie Hsia
(74) *Attorney, Agent, or Firm* — Edell, Shapiro & Finnan, LLC

(57) ABSTRACT

A television system includes: a storage unit, storing a plurality of candidate multimedia files and a plurality of program instructions; a display unit; a trigger signal receiving unit, receiving a trigger signal; and a processing unit, executing the program instructions to perform operations of: playing a target multimedia file via the display unit, generating target characteristic information according to the target multimedia file, generating a plurality of sets of candidate characteristic information respectively corresponding to the candidate multimedia files according to the candidate multimedia files, selecting one of the candidate multimedia files according to the target characteristic information and the candidate characteristic information in response to the trigger signal, and playing the selected candidate multimedia file via the display unit to replace the playback of the target multimedia file.

18 Claims, 2 Drawing Sheets

US 9,848,156 B2

TELEVISION SYSTEM AND MULTIMEDIA PLAYING METHOD

This application claims the benefit of Taiwan application Serial No. 105101190, filed Jan. 15, 2016, the subject matter of which is incorporated herein by reference.

BACKGROUND OF THE INVENTION

Field of the Invention

The invention relates in general to a television system, and more particularly to a television system capable of automatically searching and playing an associated multimedia file to replace a currently played multimedia file, and an associated method.

Description of the Related Art

Multimedia contents currently being viewed by a user on a television may not be appropriate for the viewing of all family members at times. When a television is located in a public area such as the living room, a user inevitably encounters occasional appearance of family members while viewing a film. If the user is able to quickly switch contents currently played on the television at this point, awkward situations among family members can be prevented.

SUMMARY OF THE INVENTION

It is an object of the present invention to provide a television system and a multimedia playing method for preventing awkward situations while viewing a video.

The present invention discloses a television system. The television system includes: a storage unit, storing a plurality of candidate multimedia files and a plurality of program instructions; a display unit; a trigger signal receiving unit, receiving a trigger signal; and a processing unit, coupled to the storage unit and the display unit, executing the program instructions to perform operations of: playing a target multimedia file via the display unit, generating target characteristic information according to the target multimedia file, generating a plurality of sets of candidate characteristic information respectively corresponding to the candidate multimedia files according to the candidate multimedia files, selecting one of the candidate multimedia files according to the target characteristic information and the plurality of sets of candidate characteristic information in response to the trigger signal, and playing the selected candidate multimedia file via the display unit to replace the playback of the target multimedia file.

The present invention further discloses a multimedia playing method suitable for a television system. The television system includes a storage unit, a display unit and a trigger signal receiving unit. The storage unit stores a plurality of candidate multimedia files. The method includes: playing a target multimedia file via the display unit; generating target characteristic information according to the target multimedia file; generating a plurality of sets of candidate characteristic information respectively corresponding to the candidate multimedia files according to the candidate multimedia files; receiving a trigger signal by the trigger signal receiving unit; in response to the trigger signal, selecting one of the candidate multimedia files according to the target characteristic information and the plurality of sets of candidate characteristic information; and playing the selected candidate multimedia file via the display unit to replace the playback of the target multimedia file.

The television system and the multimedia playing method of the present invention are capable of selecting a multimedia file having similar chrominance to replace the playback of an original multimedia file to reduce the chance of being noticed during the switching process of the multimedia file, thereby preventing the occurrence of an awkward situation.

The above and other aspects of the invention will become better understood with regard to the following detailed description of the preferred but non-limiting embodiments. The following description is made with reference to the accompanying drawings.

DETAILED DESCRIPTION OF THE INVENTION

The present invention discloses a television system and a multimedia playing method. In possible implementation, one person skilled in the art can choose equivalent elements or steps to realize the present invention; that is, the implementation of the present invention is not limited to the embodiments below.

Figure 1:
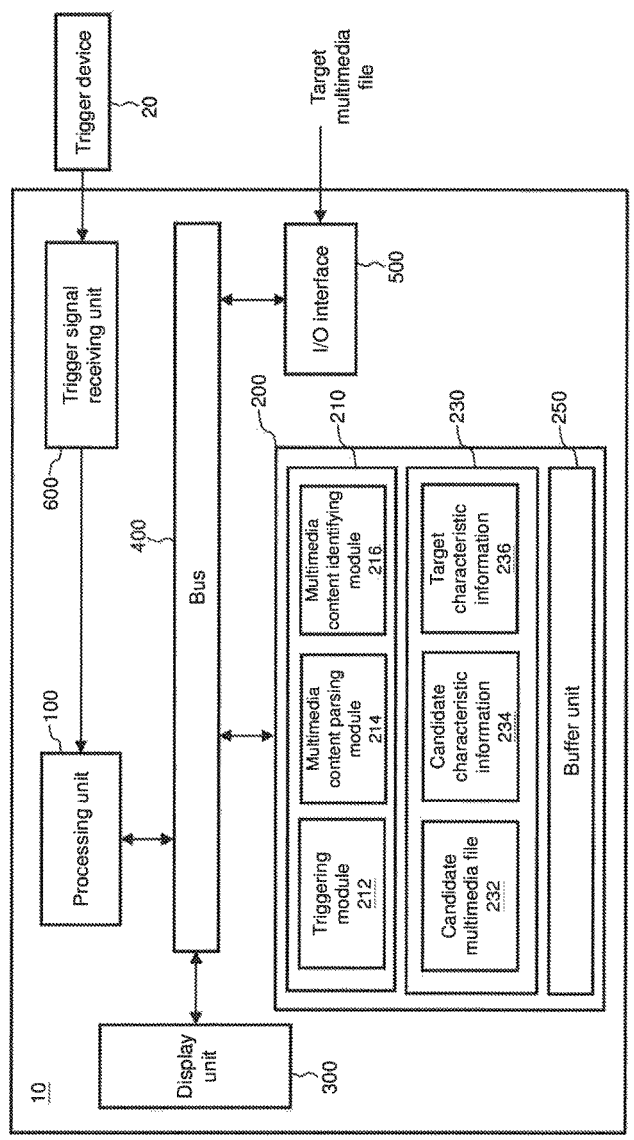
FIG. 1 is a block diagram of a television system according to an embodiment of the present invention.

FIG. 1 shows a block diagram of a television system 10 according to an embodiment of the present invention. The television system 10 includes a processing unit 100, a storage device 200, a display unit 300, a bus 400, and input/output (I/O) interface 500 and a trigger signal receiving unit 600. For example, the processing unit 100 is a central processing unit (CPU), a microcontroller, or a microprocessor that executes program instructions to perform various functions of the television system 10.

A target multimedia file currently being viewed by a user may be stored in the television system 10, or may be inputted from an external device, In the embodiment in FIG. 1, the television system 10 receives a target multimedia file outside of the television system 10 via the I/O interface 500. For example, the I/O interface 500 may be an audiovisual transmission interface (e.g., High-Definition Multimedia Interface (HDMI), DisplayPort, USB Type-C, Mobile High-Definition Link (MHL) or a network transmission interface.

The trigger signal receiving unit 600 receives a trigger signal sent from a trigger device 20, generates a control signal in response to the trigger signal, and transmits the control signal to the processing unit 100. For example, the trigger device 20 is a remote controller of the television system 10, or a portable electronic device, e.g., a cell phone or a tablet computer, capable of executing an application program to communicate with the television system 10. In one embodiment, the trigger device 20 communicates with the television system 10 via an infrared or Bluetooth interface. Thus, the trigger signal receiving unit 600 may be an infrared receiver or a Bluetooth receiver. Further, the trigger device 20 may be provided with a key (a physical key or a virtual key displayed on a touch screen) or a motion sensor. When the user needs to quickly switch a video that is currently being played by the television system 10, the user may use the key or the motion sensor to make the trigger device 20 may send the trigger signal.

The storage device 200 includes a storage unit 210, a storage unit 230 and a buffer unit 250. For example, the storage unit 210 may be a system memory of the television system 10 and primarily used for a process currently being performed by the processing unit 100, and may be implemented by a memory such as a DRAM or SDRAM. The process performed by the processing unit 100 may be divided into different function modules according to functions and attributes. For example, the storage unit 210 stores a triggering module 212, a multimedia content parsing module 214 and a multimedia content identifying module 216. The storage unit 230 may be implemented by a non-volatile storage unit, e.g., a flash, a magnetic disk drive or a solid-state hard drive. The storage unit 230 is primarily for storing system data (e.g., program instructions and system parameters) of the television system 10, a plurality of pre-stored candidate multimedia files 232, candidate characteristic information 234 of the candidate multimedia files 232, and target characteristic information 236 of the target multimedia file. The buffer unit 250 is for temporarily storing the target multimedia file, and may be implemented by a DRAM.

After receiving the target multimedia file via the I/O interface 500, the television system 10 first temporarily stores the target multimedia file in the buffer unit 250 of the storage device 200 via the bus 400. The processing unit 100 reads the target multimedia file from the buffer unit 250 via the bus 400, and performs a data process on image data. For example but not limited to, the data process includes one or all of steps of decoding, decrypting, scaling, de-interlacing and decompressing. The television system 10 then plays the processed image data via the display unit 300. The display unit 300 includes a display panel and an associated control circuit. The associated control circuit controls a display element (e.g., one pixel is one display element) on the display panel to present the processed image data on the display panel, hence playing the target multimedia file.

The multimedia content parsing module 214 parses the target multimedia file to obtain the target characteristic information 236, which is associated with the image data of the target multimedia file. More specifically, the target characteristic information 236 is associated with pixel data of a plurality of pixels of a plurality of frames of the target multimedia file. In one embodiment, the foregoing pixel data is chrominance of the pixels. For example, when the pixel data is represented by an RGB format, the target characteristic information is obtained from performing mathematical calculations on R values, G values and B values of the pixel data. When the pixel data is represented by a YUV (equivalently YCbCr or YPbPr) format, the target characteristic information is obtained from performing mathematical calculations on U (equivalently Cb or Cr) values and V (equivalently Cr or Pr) values of the pixel data. Details for generating the target characteristic information are to be given with an example shortly. After obtaining the target characteristic information 236, the processing unit 100 stores the target characteristic information 236 in the storage unit 230 of the storage device 200.

The multimedia content parsing module 214 parses the candidate multimedia files 232 by a same method as that for the target multimedia file to generate a corresponding set of candidate characteristic information 234 for each of the candidate multimedia files 232. As the candidate multimedia files 232 are pre-stored in the storage device 200, the candidate characteristic information 234 may also be generated in advance. The term "generated in advance" means that, before the target multimedia file is played, the multimedia content parsing module 214 has already completely parsed the candidate multimedia files 232 and generated the candidate characteristic information 234. Further, during the process of playing the target multimedia file, the multimedia content parsing module 214 constantly updates the target characteristic information 236 according to contents of different parts of the target multimedia file.

The multimedia file identifying module 216 compares the target characteristic information 236 with the candidate characteristic information 234, and selects one of the candidate multimedia files 232 according to the comparison result. Details of the comparison mechanism of the multimedia content identifying module 216 are to be given with an example shortly.

The triggering module 212 mainly serves the purpose of monitoring whether the trigger signal receiving unit 600 sends a control signal. After having learned that the trigger signal receiving unit 600 has sent the control signal, the triggering module 212 notifies the multimedia content identifying module 216 to perform a selection process on the candidate multimedia files 232. The processing unit 100 then controls the display unit 300 to display the candidate multimedia file 232 selected by the multimedia content identifying module 216 to replace the playback of the target multimedia file. That is, the display unit 300 immediately displays the selected candidate multimedia file 232, and suspends or closes the target multimedia file.

Details of how the multimedia content parsing module 214 generates characteristic information of multimedia files are given below. For the target multimedia file and the candidate multimedia files, each file includes a plurality of frames, each of which including a plurality of pixels. The pixel data of each pixel includes chrominance values. For example, a pixel represented by the RGB format includes three types of chrominance values (each of R, G and B representing one type of chrominance value), and a pixel represented by the YUV format includes two types of chrominance values (each of U and V representing one type of chrominance value, and Y representing a luminance value). When parsing a multimedia file, the multimedia content parsing module 214 calculates using the chrominance values of all pixels of consecutive frames to generate the characteristic information. Taking the RGB format as an example, two methods that the multimedia content parsing module 214 uses for calculating the characteristic value are described below.

The first method includes following steps,

1) A plurality of consecutive frames are selected from a multimedia file.

2) R values, G values and B values of all of the pixels of all of the frames are respectively added to respectively obtain an R chrominance sum, a G chrominance sum and a B chrominance sum.

3) The R chrominance sum, the G chrominance sum and the B chrominance sum are respectively divided by a sum of the three chrominance to respectively obtain an R chrominance ratio, a G chrominance ratio and a B chrominance ratio. These three ratios are the characteristic information of the multimedia file.

The second method includes following steps.

1) A plurality of consecutive frames are selected from a multimedia file.

2) R values, G values and B values of all of the pixels of all of the frames are respectively added to obtain an R chrominance sum, a G chrominance sum and a B chrominance sum.

3) The R chrominance sum, the G chrominance sum and the B chrominance sum are respectively divided by the total pixel number of the frames to respectively obtain an R chrominance average, a G chrominance average and a B chrominance average. These three chrominance averages are the characteristic information of the multimedia file.

It should be noted that, if the pixel data is represented by the YUV format, only the U values and the V values are calculated in the first and second methods, and the characteristic information correspondingly includes U and V chrominance ratios or U and V chrominance averages. In one embodiment, the playback sequence of at least one of the plurality of consecutive frames selected in the first method or the second method is later than that of the currently played frame. In another embodiment, the playback sequence of at least one of the consecutive frames is later than that of the currently played frame, and the consecutive frames include the currently played frame.

Details of two methods that the multimedia content identifying module 216 uses for determining the candidate multimedia file are given below. These two methods respectively correspond to the two foregoing methods for calculating the characteristic information.

The first method includes following steps.

1) The largest chrominance ratio is identified from the characteristic information and regarded as a reference value. For example, assuming that the G chrominance ratio is the largest of the three chrominance ratios, the G chrominance ratio is regarded as the reference value.

2) The chrominance ratio having the same attribute as the reference value is selected from the plurality of sets of candidate characteristic information. In the above example, the G chrominance ratios of the plurality of sets of candidate information are selected.

3) In the plurality of sets of candidate information, the chrominance ratio having the attribute as the reference value is compared with the reference value to identify the set of candidate characteristic information having the smallest difference, and the candidate multimedia file corresponding to that set of candidate characteristic information having the smallest difference is selected.

The second method includes following steps.

1) Respective absolute differences of the chrominance averages between the target characteristic information and the plurality sets of candidate characteristic information are calculated. Assume that the R, G and B chrominance averages of the target characteristic information are R1, G1 and B1, respectively. The R, G and B chrominance averages of the candidate characteristic information are R2, G2 and B2, respectively. In this step, |R1-R2|, |G1-G2| and |B1-B2| are calculated.

2) The set of candidate characteristic information having the smallest sum of the above differences is identified. That is, the set of candidate characteristic information having a smallest value of |R1-R2|+|G1-G2|+|B1-B2| is identified.

3) The candidate multimedia file corresponding to the above set of candidate characteristic information is selected.

In fact, the second method is a calculating of the sum of absolute differences (SAD). For both of the first method and the second method, the main purpose is, from the plurality of candidate multimedia files, to identify one candidate multimedia file that has the chrominance most similar to that of an image of the target multimedia file that is currently being played. By replacing the playback of the target multimedia file with the candidate multimedia file having similar chrominance, the switching process of the videos may be less abrupt and less noticeable to others, thereby preventing an awkward situation.

Figure 2:
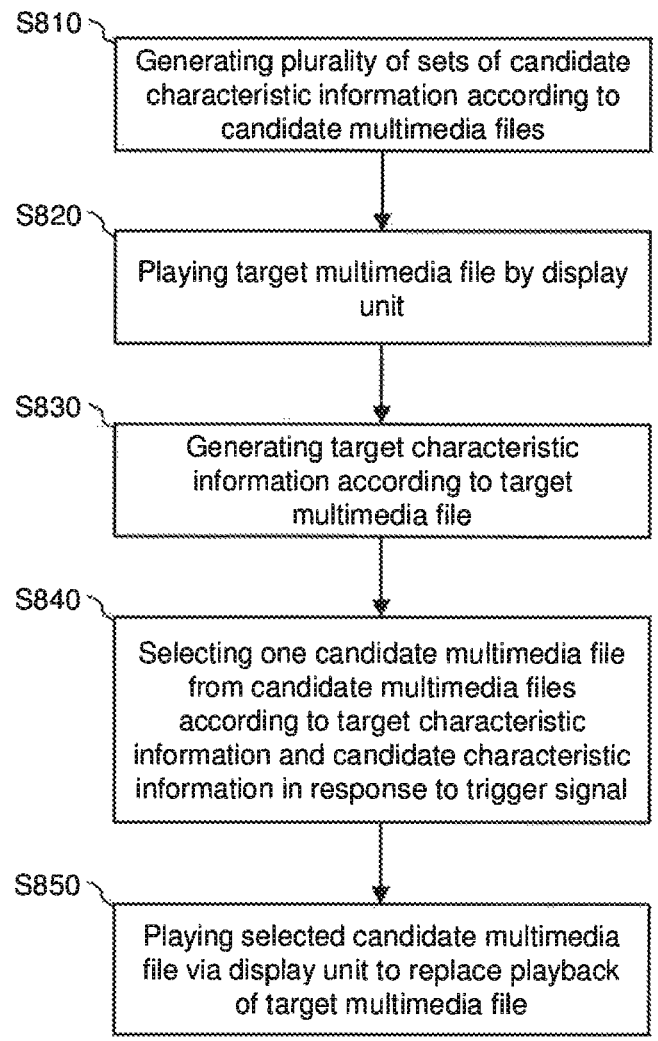
FIG. 2 is a flowchart of a multimedia playing method according to an embodiment of the present invention.

In addition to the foregoing television system 10, the present invention correspondingly discloses a multimedia playing method. The multimedia playing method, applicable to the television system 10 capable of preventing an awkward situation, replaces a multimedia file currently being played by another multimedia file having similar chrominance to prevent an awkward situation. The method may be performed by the television system 10 or an equivalent device. Referring to FIG. 2 showing a flowchart of a multimedia playing method according to an embodiment of the present invention, the multimedia playing method includes following steps.

In step S810, a plurality of sets of candidate characteristic information are generated according to a plurality of candidate multimedia files. The plurality sets of candidate characteristic information are generated according to pixel data of a plurality of consecutive frames of the corresponding candidate multimedia files. For example, the plurality sets of candidate characteristic information is obtained from one of the two foregoing methods for calculating the characteristic information.

In step S820, a target multimedia file is played via a display unit.

In step S830, a set of target characteristic information is generated according to the target multimedia file. During the process of playing the target multimedia file, the target multimedia file is constantly parsed to generate the target characteristic information, such that the target characteristic information is constantly updated during the process of playing the target multimedia file. For example, consecutive frames of the target multimedia file are temporarily stored, and pixel data of the consecutive frames are calculated to obtain the target characteristic information. In one embodiment, the playback sequence of at least one of the plurality of consecutive frames according to which the target characteristic information is generated is later than that of the currently played frame, and the consecutive frames do not include the currently played frame. In another embodiment, the consecutive frames include the currently played frame. The target characteristic information and the plurality of sets of candidate characteristic information are generated by the same characteristic information calculating method.

In step S840, in response to a trigger signal, one candidate multimedia file is selected from the candidate multimedia files according to the target characteristic information and the plurality sets of candidate characteristic information. When the trigger signal is detected (for example, the user wishes to switch the multimedia file), the target characteristic information is immediately compared with the plurality of sets of candidate characteristic information to select one of the candidate multimedia files. This step may adopt one of the two abovementioned methods for determining the candidate multimedia files. In one embodiment, in order to further speed up the process of switching the multimedia files, this step of the comparison of the target characteristic information and the plurality of sets of candidate characteristic information may immediately be performed each time new target characteristic information is generated, so as to determine the candidate multimedia file for replacing the target multimedia file.

In step S850, the selected multimedia file is played via the display unit to replace the playback of the target multimedia file. Once one of the candidate multimedia files is selected, the selected candidate multimedia file is immediately played. That is, the display panel of the television is caused to immediately play contents of the selected multimedia file while suspending or closing the target multimedia file.

In addition to the television system 10, the present invention may also be implemented in a digital set-top-box (STB). Different from the television system 10, the digital STB excludes the display unit. Thus, the processed multimedia file is transmitted to the television via an additional input/output interface when the digital STB plays a video.

One person skilled in the art can easily understand details and variations of the method in FIG. 2 based on the disclosure associated with the device in FIG. 1 of the present invention, and such repeated description shall be omitted herein. While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A television system, comprising:
   a storage unit, storing a plurality of candidate multimedia files and a plurality of program instructions;
   a display unit;
   a trigger signal receiving unit, receiving a trigger signal; and
   a processing unit, coupled to the storage unit and the display unit, executing the program instructions to perform operations of:
      playing a target multimedia file via the display unit;
      generating target characteristic information according to the target multimedia file;
      generating a plurality of sets of candidate characteristic information according to the candidate multimedia files, wherein the plurality of sets of candidate characteristic information respectively correspond to the candidate multimedia files;
      in response to the trigger signal, selecting one candidate multimedia file from the candidate multimedia files according to the target characteristic information and the plurality of sets of candidate characteristic information; and
      playing the selected candidate multimedia file via the display unit to replace playback of the target multimedia file.

2. The television system according to claim 1, wherein the target multimedia file comprises a plurality of frames, each of the frames comprises a plurality of pixels, and the step of generating the target characteristic information according to the target multimedia file comprises:
   selecting a plurality of consecutive frames from the frames of the target multimedia file; and
   generating the target characteristic information according to pixel data of the consecutive frames.

3. The television system according to claim 2, wherein the pixel data of the consecutive frames is chrominance values of the pixels of the consecutive frames.

4. The television system according to claim 3, wherein each pixel comprises a first chrominance value and a second chrominance value, the target characteristic information comprises a first chrominance ratio and a second chrominance ratio, the first chrominance ratio is a ratio of a sum of the first chrominance values of the consecutive frames to a sum of the first chrominance values and the second chrominance values of the consecutive frames, and the second chrominance ratio is a ratio of a sum of the second chrominance values of the consecutive frames to the sum of the first chrominance values and the second chrominance values of the consecutive frames.

5. The television system according to claim 4, wherein each set of the candidate characteristic information comprises a third chrominance ratio and a fourth chrominance ratio of a plurality of frames of the corresponding candidate multimedia file, the third chrominance ratio is a ratio of a sum of the first chrominance values of the frames to a sum of first chrominance values and the second chrominance values of the frames, and the fourth chrominance ratio is a ratio of a sum of the second chrominance values of the frames to the sum of the first chrominance values and the second chrominance values of the frames, and the step of selecting one candidate multimedia file from the candidate multimedia files according to the target characteristic information and the plurality of sets of candidate characteristic information comprises:
   determining a larger one of the first chrominance ratio and the second chrominance ratio;
   calculating a difference between the larger one of the first chrominance ratio and the second chrominance ratio and a corresponding one of the third chrominance ratio and the fourth chrominance ratio; and
   determining the candidate multimedia file according to the difference.

6. The television system according to claim 3, wherein each of the pixels comprises a first chrominance value and a second chrominance value, the target characteristic information comprises a first chrominance average and a second chrominance average, the first chrominance average is a result of dividing a sum of the first chrominance values of the consecutive frames by a total pixel number included in the consecutive frames, and the second chrominance average is a result of dividing a sum of the second chrominance values of the consecutive frames by the total pixel number included in the consecutive frames.

7. The television system according to claim 6, wherein each set of the candidate characteristic information comprises a third chrominance average and a fourth chrominance average of the plurality of frames of the corresponding multimedia file, the third chrominance average is a result of dividing the sum of the first chrominance values of the frames by the total pixel number included in the frames, the fourth chrominance average is a result of dividing the sum of the second chrominance values of the frames by the total pixel number included in the frames, and the step of selecting one candidate multimedia file from the candidate multimedia files according to the target characteristic information and the plurality of sets of candidate characteristic information comprises:
   calculating a first difference between the first chrominance average and the third chrominance average;
   calculating a second difference between the second chrominance average and the fourth chrominance average; and
   determining the selected candidate multimedia file according to the first difference and the second difference.

8. The television system according to claim 2, wherein the step of selecting the plurality of consecutive frames from the frames of the target multimedia file comprises:
   selecting the consecutive frames according to a currently played frame of the target multimedia file;
   wherein, a playback sequence of at least one frame of the consecutive frames is later than a playback sequence of the currently played frame.

9. The television system according to claim 8, wherein the consecutive frames comprise the currently played frame.

10. A multimedia playing method, suitable for a television system, the television system comprising a storage unit, a display unit and a trigger signal receiving unit, the storage unit storing a plurality of candidate multimedia files, the method comprising:

playing a target multimedia file via the display unit;

generating target characteristic information according to the target multimedia file;

generating a plurality of sets of candidate characteristic information according to the candidate multimedia files, wherein the plurality of sets of candidate characteristic information respectively correspond to the candidate multimedia files;

receiving a trigger signal by the trigger signal receiving unit;

in response to the trigger signal, selecting one candidate multimedia file from the candidate multimedia files according to the target characteristic information and the plurality of sets of candidate characteristic information; and playing the selected candidate multimedia file via the display unit to replace playback of the target multimedia file.

11. The multimedia playing method according to claim 10, wherein the target multimedia file comprises a plurality of frames, each of the frames comprises a plurality of pixels, and the step of generating the target characteristic information according to the target multimedia file comprises:

selecting a plurality of consecutive frames from the frames of the target multimedia file; and generating the target characteristic information according to pixel data of the consecutive frames.

12. The multimedia playing method according to claim 11, wherein the pixel data of the consecutive frames is chrominance values of the pixels of the consecutive frames.

13. The multimedia playing method according to claim 12, wherein each pixel comprises a first chrominance value and a second chrominance value, the target characteristic information comprises a first chrominance ratio and a second chrominance ratio, the first chrominance ratio is a ratio of a sum of the first chrominance values of the consecutive frames to a sum of the first chrominance values and the second chrominance values of the consecutive frames, and the second chrominance ratio is a ratio of a sum of the second chrominance values of the consecutive frames to the sum of the first chrominance values and the second chrominance values of the consecutive frames.

14. The multimedia playing method according to claim 13, wherein each set of the candidate characteristic information comprises a third chrominance ratio and a fourth chrominance ratio of a plurality of frames of the corresponding candidate multimedia file, the third chrominance ratio is a ratio of a sum of the first chrominance values of the frames to a sum of first chrominance values and the second chrominance values of the frames, and the fourth chrominance ratio is a ratio of a sum of the second chrominance values of the frames to the sum of the first chrominance values and the second chrominance values of the frames, and the step of selecting one candidate multimedia file from the candidate multimedia files according to the target characteristic information and the plurality of sets of candidate characteristic information comprises:

determining a larger one of the first chrominance ratio and the second chrominance ratio;

calculating a difference between the larger one of the first chrominance ratio and the second chrominance ratio and a corresponding one of the third chrominance ratio and the fourth chrominance ratio; and determining the candidate multimedia file according to the difference.

15. The multimedia playing method according to claim 12, wherein each of the pixels comprises a first chrominance value and a second chrominance value, the target characteristic information comprises a first chrominance average and a second chrominance average, the first chrominance average is a result of dividing a sum of the first chrominance values of the consecutive frames by a total pixel number included in the consecutive frames, and the second chrominance average is a result of dividing a sum of the second chrominance values of the consecutive frames by the total pixel number included in the consecutive frames.

16. The multimedia playing method according to claim 15, wherein each set of the candidate characteristic information comprises a third chrominance average and a fourth chrominance average of a plurality of frames of the corresponding multimedia file, the third chrominance average is a result of dividing a sum of the first chrominance values of the frames by a total pixel number included in the frames, the fourth chrominance average is a result of dividing a sum of the second chrominance values of the frames by the total pixel number included in the frames, and the step of selecting one candidate multimedia file from the candidate multimedia files according to the target characteristic information and the sets of candidate characteristic information comprises:

calculating a first difference between the first chrominance average and the third chrominance average;

calculating a second difference between the second chrominance average and the fourth chrominance average; and determining the selected candidate multimedia file according to the first difference and the second difference.

17. The multimedia playing method according to claim 11, wherein the step of selecting the plurality of consecutive frames from the frames of the target multimedia file comprises:

selecting the consecutive frames according to a currently played frame of the target multimedia file;

wherein, a playback sequence of at least one frame of the consecutive frames is later than a playback sequence of the currently played frame.

18. The multimedia playing method according to claim 17, wherein the consecutive frames comprise the currently played frame.

* * * * *